United States Patent Office 2,788,363
Patented Apr. 9, 1957

2,788,363

NEW 1,2,3,4,5,6,7,8-OCTAHYDROPHENANTHRENE-CARBOXYLIC ACIDS AND DERIVATIVES THEREOF AND PROCESS OF MAKING SAME

Georg Anner, Basel, and Karl Miescher, Riehen, Switzerland, assignors to Ciba Pharmaceutical Products, Inc., Summit, N. J.

No Drawing. Application August 3, 1953,
Serial No. 372,140

Claims priority, application Switzerland August 26, 1952

4 Claims. (Cl. 260—468.5)

The present invention relates to the manufacture of 1:2:3:4:5:6:7:8-octahydrophenanthrene-2-carboxylic acids and their derivatives such as salts, esters, nitriles and acid amides, which contain in 7-position a free or functionally converted hydroxyl group, in 1-position a low alkyl radical and in 2-position hydrogen or a low alkyl radical. The new hydrophenanthrene-2-carboxylic acids accordingly possess the following ring structure with the aromatic ring B:

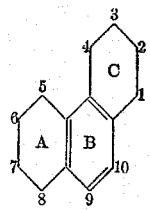

As regards the low alkyl radicals in 1- and 2-positions which have been mentioned, there are concerned for example methyl, ethyl or propyl radicals.

It has been shown that the tested compounds of this series are of pharmacological interest. Although they are but weak estrogenics, they possess a pronounced antiandrogenic activity.

Such hydrophenanthrene-2-carboxylic acids and their derivatives are, for example, obtained when hydrophenanthrene-2-carboxylic acids or their derivatives, with aromatic rings A and B which are correspondingly substituted in 1-, 2- and 7-positions, are treated with catalytically activated hydrogen under such conditions that the ring A is selectively hydrogenated. Hydrogenation using nickel catalysts is primarily suitable. In this operation it is preferable to work in the presence of strong alkaline agents, such as alkali hydroxides, at elevated temperature under pressure. The acids obtained may then be converted into their derivatives by known methods.

The hydrophenanthrene-2-carboxylic acids and their derivatives used as starting materials can be prepared by conventional methods.

The following examples illustrate the invention, the relation between part by weight and part by volume being the same as that between the gram and the cubic centimeter:

Example 1

20 parts by weight of 1-ethyl-2-methyl-7-hydroxy-1:2:3:4-tetrahydrophenanthrene-2-carboxylic acid of melting point 230-237° C. are dissolved in 500 parts by volume of alcohol which contains 10 parts by weight of potassium hydroxide. After the addition of 20 parts by weight of a nickel catalyst, the solution is heated in a pressure vessel, under a hydrogen pressure of about 130 atmospheres, to about 100° C. The hydrogenation is complete after 5 hours. The whole is then allowed to cool, filtered from the catalyst, the majority of the alcohol evaporated under reduced pressure, after the addition of water the acid precipitated with hydrochloric acid and filtration carried out. After recrystallization from ethyl acetate, 18 parts by weight are obtained of the 1-ethyl-2-methyl-7-hydroxy-1:2:3:4:5:6:7:8-octahydrophenanthrene-2-carboxylic acid of melting point 178–180° C.

The 1-ethyl-2-methyl-7-hydroxy-1:2:3:4:5:6:7:8-octahydrophenanthrene-2-carboxylic acid methyl ester obtained from the above acid by esterification with diazomethane, after crystallization from aqueous methanol, melts at 98-100° C.

The above described nuclear hydrogenation can also be carried out in the case of such 7-hydroxy-1:2:3:4-tetrahydrophenanthrene-2-carboxylic acids as contain in 1-position any desired low alkyl radical and in 2-position a hydrogen atom or a low alkyl radical. Thus there is obtained in the hydrogenation of 1:2-dipropyl-7-hydroxy-1:2:3:4-tetrahydrophenanthrene-2-carboxylic acid the 1:2-dipropyl-7-hydroxy-1:2:3:4:5:6:7:8-octahydrophenanthrene-2-carboxylic acid.

The resultant 1:2:3:4:5:6:7:8-octahydrophenanthrene-2-carboxylic acids can, in the customary manner, be esterified or converted into their salts, such as alkali, alkaline earth or ammonium salts.

Example 2

10 parts by weight of 1-ethyl-7-hydroxy-1:2:3:4-tetrahydrophenanthrene-2-carboxylic acid are added to a solution prepared from 275 parts by volume of alcohol and 5 parts by weight of potassium hydroxide. The solution, after the addition of 20 parts by weight of a nickel catalyst, is heated to about 90–100° C. in a pressure vessel under a hydrogen pressure of 130 atmospheres. After about 5 hours the whole is allowed to cool, the solution filtered from the catalyst, the filtrate concentrated under reduced pressure to a small volume and, after the addition of water, the acid precipitated with hydrochloric acid. The precipitate is separated by filtration and recrystallized from ethyl acetate. 8.5 parts by weight are obtained of the pure 1-ethyl-7-hydroxy-1:2:3:4:5:6:7:8-octahydrophenanthrene-2-carboxylic acid.

What is claimed is:

1. A compound of the group consisting of 1:2:3:4:5:6:7:8-octahydrophenanthrene-2-carboxylic acids of the formula

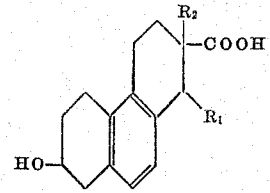

wherein $R_1$ stands for an alkyl radical containing from 1 to 3 carbon atoms and $R_2$ stands for a member of the group consisting of hydrogen and an alkyl radical containing from 1 to 3 carbon atoms, and esters thereof.

2. 1-ethyl-7-hydroxy-1:2:3:4:5:6:7:8-octahydrophenanthrene-2-carboxylic acid.

3. 1-ethyl-2-methyl-7-hydroxy-1:2:3:4:5:6:7:8-octahydrophenanthrene-2-carboxylic acid.

4. 1-ethyl-2-methyl-7-hydroxy-1:2:3:4:5:6:7:8-octahydrophenanthrene-2-carboxylic acid methyl ester.

References Cited in the file of this patent

UNITED STATES PATENTS

| | | |
|---|---|---|
| 1,850,144 | Stolz et al. | Mar. 22, 1932 |
| 2,534,466 | Miescher et al. | Dec. 19, 1950 |
| 2,574,396 | Johnson et al. | Nov. 6, 1951 |